UNITED STATES PATENT OFFICE.

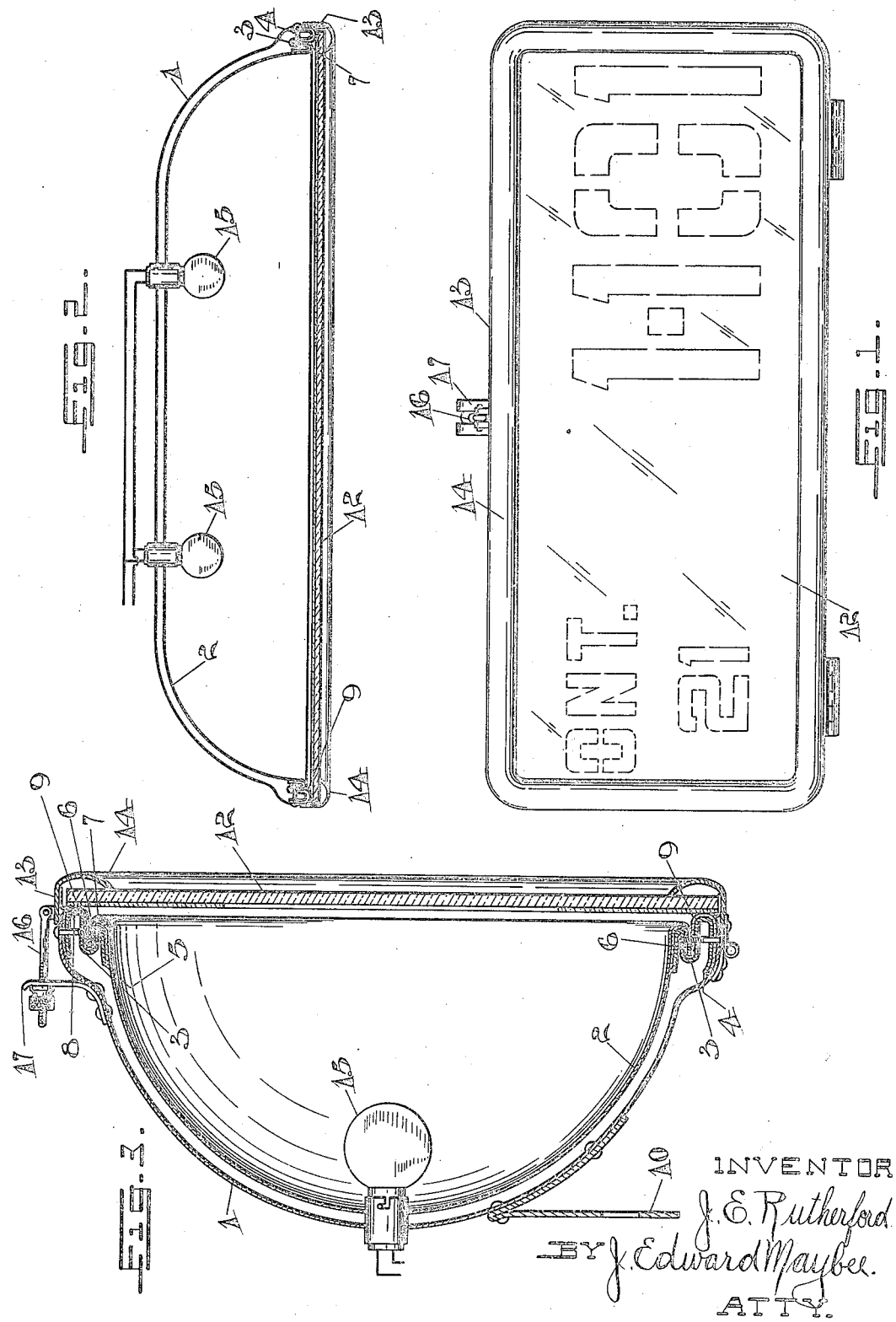

JOHN ELMER RUTHERFORD, OF TORONTO, ONTARIO, CANADA.

VEHICLE-LICENSE-NUMBER HOLDER AND ILLUMINATOR.

1,422,480. Specification of Letters Patent. Patented July 11, 1922.

Application filed September 16, 1921. Serial No. 501,180.

*To all whom it may concern:*

Be it known that I, JOHN ELMER RUTHERFORD, of the city of Toronto, in the county of York, Province of Ontario, Canada, a subject of the King of Great Britain, have invented new and useful Improvements in Vehicle-License-Number Holders and Illuminators, of which the following is a specification.

This invention relates to means for illuminating the license numbers commonly employed on automobiles so that they may be more readily distinguished at night, and my object is to devise a light strong holder which will carry a suitable transparency displaying the license number, and which will satisfactorily and evenly illuminate the same.

I attain my object by means of the constructions hereinafter described and illustrated in the accompanying drawings in which—

Fig. 1 is a front elevation of my improved holder;

Fig. 2 a longitudinal horizontal section of the same; and

Fig. 3 a vertical cross section on an enlarged scale.

In the drawings like numerals of reference indicate corresponding parts in the different figures.

1 is a hollow oblong casing open at its front. Within this casing is fitted a shallow oblong concave reflector 2. The edges of the casing and the reflector are connected by means of a rim member 3. This rim member is preferably formed of sheet metal bent to the form I will now describe.

One part 4 of the rim is adapted to lie within the edge of the casing, while the inner part 5 is adapted to sit within the edge of the reflector 2. Intermediate the inner and outer edges of the rim is formed an outward groove 6, the inner wall of the groove being shorter than the outer. The edge of the reflector is formed with an inturned flange 7, which fits into the groove. In this construction it follows that a seat 8 is provided against which a transparency may be fitted and held as hereinafter described, while the edge of the reflector with its inturned flange is spaced back of the position occupied by this seat. To prevent squeaks or rattle, a pice of soft fabric 9, such as felt, is fitted over the rim 3 as shown, this fabric being held between the edge of the outer casing and the part 4 of the rim member, while its other edge is held between the flange 7 and the inner part 5 of the rim member and may, if desired, continue round between the part 5 of the rim member and the reflector. The seat 8 is thus covered with a soft felt pad. Attaching means for the casing comprises a plate 10, which is riveted or otherwise secured to the back of the casing. The plate 10, of course, is provided with holes or slots for connection with a supporting bracket. The license number and other indicia are formed as a transparency, the letters or numbers being formed of either transparent material or opaque material contrasting in color with the sign either by transmitted or reflected light. In practice different colors may be provided for the front and rear lights so that an observer can readily tell whether he is approaching the front or rear of the vehicle when no headlights are being used. This transparency is preferably supported against the glass plate 12, which is fitted in any suitable manner in the holder frame 13 of I-section, the flange 14 being adapted to fit over the casing 1 and rim member 3. The holder frame will be pivotally connected with the casing 1 and provided with a hinged bolt 16 adapted to be received in a notch formed in a lug 17 secured to the casing. The bolt 16 is provided with a nut for releasably locking the holder frame in position.

To illuminate the transparency I provide two lamps 15 suitably spaced longitudinally of the sign so that the combined direct and reflected rays thereof will substantially evenly illuminate the transparency. These lamps will preferably be connected in parallel with a source of current so that the possibility of both lamps being out of commission at the same time is materially reduced.

It is evident that various changes in the details of my construction may be made without departing from the spirit of my invention as set forth in the accompanying claims.

What I claim as my invention is:—

1. A holder and illuminator for license numbers and the like comprising a hollow oblong casing curved vertically and having concavely curved ends; a transparency fitted to the front of the casing; a shallow oblong concave reflector of substantially the same shape as the casing fitted within the casing and spaced therefrom; and two electric lamps suitably spaced lengthwise of the reflector and positioned so that their light is reflected substantially evenly against the transparency.

2. In a license number holder and illuminator, an outer open fronted casing; an inner reflector member having its edges substantially paralleling the front edges of the casing; a rim member secured to the edges of the casing and reflector and holding them in spaced relationship and provided with an outwardly facing seat; a felt covering for said seat having its edges held in position between parts of the rim casing and reflector; and a transparency holder provided with a flange fitting over the rim and casing.

3. In a license number holder and illuminator, an outer open fronted casing; an inner reflector member having its edges substantially paralleling the front edges of the casing; a rim member fitting between the outer edges of the casing and reflector and having an outwardly facing groove formed therein, the inner wall of the groove being shorter than the outer; a rearwardly bent flange on the reflector fitting in said groove; and a transparency holder provided with a flange fitting over the rim and casing.

4. In a license number holder and illuminator, an outer open fronted casing; an inner reflector member having its edges substantially paralleling the front edges of the casing; a rim member fitting between the outer edges of the casing and reflector and having an outwardly facing groove formed therein, the inner wall of the groove being shorter than the outer; a rearwardly bent flange on the reflector fitting in said groove; a transparency holder provided with a flange fitting over the rim and casing; and a soft packing between said holder and the rim.

5. In a license number holder and illuminator, an outer open fronted casing; an inner reflector member having its edges substantially paralleling the front edges of the casing; a rim member fitting between the outer edges of the casing and reflector and having an outwardly facing groove formed therein, the inner wall of the groove being shorter than the outer; a rearwardly bent flange on the reflector fitting in said groove; a transparency holder provided with a flange fitting over the rim and casing; and a strip of soft material held between the rim and casing, passing round the face of the rim and into the groove.

6. In a license number holder and illuminator, an outer open fronted casing; an inner reflector member having its edges substantially paralleling the front edges of the casing; a rim member fitting between the outer edges of the casing; a rim member fitting between the outer edges of the casing and reflector and having an outwardly facing groove formed therein, the inner wall of the groove being shorter than the outer; a rearwardly bent flange on the reflector fitting in said groove; a transparency holder provided with a flange fitting over the rim and casing; and a strip of soft material held between the rim and casing, passing round the face of the rim and into the groove and under the flange of the reflector.

7. In a license number holder and illuminator, an outer open fronted casing; an inner reflector member having its edges substantially paralleling the front edges of the casing; a rim member secured to the edges of the casing and reflector and holding them in spaced relationship and provided with a felt covered outwardly facing seat; an attaching plate secured to the back of the casing; and a transparency holder provided with a flange fitting over the rim and casing.

Signed at Toronto Can. this 8th day of Sept. 1921.

JOHN ELMER RUTHERFORD.